United States Patent [19]

Pasco

[11] Patent Number: 5,745,665
[45] Date of Patent: Apr. 28, 1998

[54] METHOD FOR PROCESSING A THREE-DIMENSIONAL DATA SET INTO A COMPOSITE TWO-DIMENSIONAL IMAGE VIEWABLE AS A THREE-DIMENSIONAL IMAGE

[75] Inventor: Michael H. Pasco, Carmel, Calif.

[73] Assignees: Douglas F. Winnek; Eleanor P. Winnek, both of Carmel, Calif.

[21] Appl. No.: 719,731

[22] Filed: Sep. 25, 1996

Related U.S. Application Data

[63] Continuation of Ser. No. 277,872, Jul. 20, 1994, abandoned.

[51] Int. Cl.$^6$ .................................................. G00T 15/00
[52] U.S. Cl. ...................................... 395/127; 395/119
[58] Field of Search .......................... 395/118–120, 127

[56] References Cited

U.S. PATENT DOCUMENTS

| | | | |
|---|---|---|---|
| Re. 35,029 | 8/1995 | Sandoe et al. | 355/22 |
| 5,264,964 | 11/1993 | Faris | 359/465 |
| 5,311,329 | 5/1994 | Haeberli et al. | 358/448 |
| 5,359,454 | 10/1994 | Steenblik et al. | 359/463 |
| 5,398,131 | 3/1995 | Hall et al. | 359/465 |
| 5,430,474 | 7/1995 | Hines | 348/42 |
| 5,438,429 | 8/1995 | Haeberli et al. | 358/445 |
| 5,495,576 | 2/1996 | Ritchey | 395/125 |

OTHER PUBLICATIONS

Eichenlaub, Jesse et al., "An In Cockpit 'Situation Awareness' Autostereoscopic Avionics Display," *Digital Avionics Systems, 1994 Conference*, pp. 257–268, (1994).

Soatto, Stefano et al, "Three Dimensional Transparent Structure Segmentation and Multiple 3D Motion Estimation from Monocular Image Sequences," *Motion of Non–Rigid and Articulated Objects*, 1994 Workshop, pp. 228–235, (May 1994).

Dumbreck, A. A. et al, "3–D TV Display for Industrial Applications," *IEE Colloq.* (1992) No. 173: *Stereoscopic Television*, pp. 1–7, (1992).

Börner, R., "Autostereoscopic Lenticular Systems," *IEE Colloq.* (1992) No.173: *Stereoscopic Television*, pp. 1–5, (1992).

Sexton, Ian, "Parallax Barrier Display Systems," *IEE Colloq.* (1992) No. 173: *Stereoscopic Television*, pp. 1–5, (1992).

Stöhr, Peter, "Using Two–Dimensional Subspaces Gained by Intersections to Recognize Three–Dimensional Objects," *Robotics and Automation, 1994 IEEEE International Conference*, pp. 1175–1180, (1994).

Kameyama, Ken–ichi et al, "A Direct 3–D Shape Modeling System," *Virtual reality, 1993 International Symposium*, pp. 519–524, (1993).

Spyra, Wolfgang J. T. et al, "Computed Tomographic Imaging of the Coronary Arterial Tree–Use of Local Tomography," *IEEE Transactions on Medical Imaging*, pp. 1–4, (1990).

Moros, Eduardo et al, "Simulations of Scanned Focused Ultra sound Hyperthermia: The Effects of Scanning Speed and Pattern on the Temperature Fluctuations at the Focal Depth," *IEEE transactions on Ultrasonics, Ferroelectronics, and Frequency*, pp. 552–560, (1988).

Jacobs, David W., "2–D Images of 3–D Oriented Points," *Computer Vision and Pattern Recognition*, 1993 (*CVPR*), pp. 226–232, (1993).

*Primary Examiner*—Joseph H. Feild
*Assistant Examiner*—Rudolph Buchel
*Attorney, Agent, or Firm*—Townsend and Townsend and Crew LLP

[57] ABSTRACT

A method for processing a three-dimensional data set into a two-dimensional image that is viewable as a three-dimensional image is provided. The three-dimensional data set represents an object to be viewed and is sampled to create multiple two-dimensional data sets where each two-dimensional data set represents a different view of the object. Then, a two-dimensional image is constructed from the two-dimensional data sets. The aspects represented by the two-dimensional data sets can be individually viewed from the two-dimensional image through the use of a lenticular screen or a computer generated grating.

13 Claims, 7 Drawing Sheets

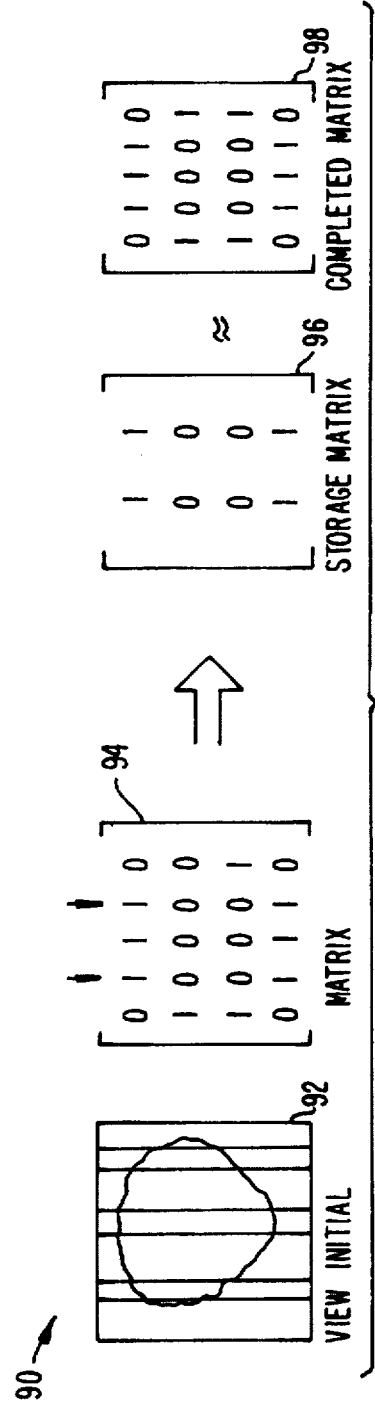
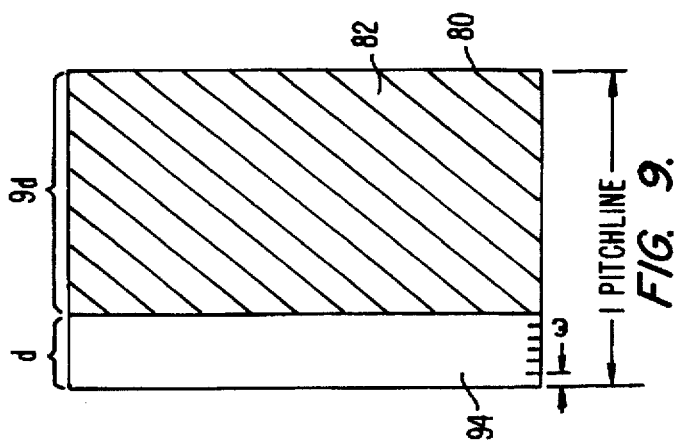
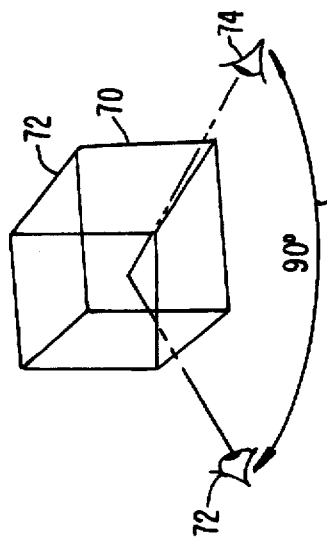

METHOD FOR PROCESSING A THREE-DIMENSIONAL DATA SET INTO A COMPOSITE TWO-DIMENSIONAL IMAGE VIEWABLE AS A THREE-DIMENSIONAL IMAGE

This is a continuation of application No. 08/277,872, filed Jul. 20, 1994, now abandoned.

BACKGROUND OF THE INVENTION

In U.S. Pat. No. 4,823,156, a mechanical process is disclosed in which a grating is moved laterally across a film optically aligned with an object to be viewed in three dimensions to produce a two-dimensional composite image of the object. After the film has been processed, it is moved back and forth to obtain a three-dimensional image of the object.

The purposes of the present invention is to replicate the mechanical process of the camera of the above patent in a digital video processing algorithm format. This digital format will allow for the production of composite images which can be resolved in three-dimensions from three-dimensional data sets. In the digital system of the present invention, digital data is drawn, i.e., sampled, from a three-dimensional object transformed into a data set as specified by an algorithm known as a sampling algorithm. A two-dimensional data set is constructed from the sampled data. The two-dimensional data set can then be printed and viewed through a grating in the same manner as a photograph taken with the camera of the above patent.

SUMMARY OF THE INVENTION

The present invention is directed to an apparatus and method in which a software video process operates to produce images that, when printed and viewed in accordance with a specific procedure, will resolve two-dimensional images into three-dimensional images. Thus, the invention is suitable for a wide variety of uses, including the viewing of organs of the human body.

An algorithm is used to sample data from a three-dimensional data set. This algorithm is used by the computer to generate multiple two-dimensional data sets. Such two-dimensional data sets are used to form a two-dimensional image by simulation of a grating used in the mechanical process of the above patent. The ratio of the width of the opaque lines of the simulated grating to the width d of the transparent slits typically is 9:1 (FIG. 1).

Lateral movement of the start point or initial aspect of the sampled columns of data is defined by software. The software is in the form of an algorithm which simulates an appearance of the mask or grating in front of the film of a camera system which includes the data set or matrix and the mask itself. The sampling is performed for a total distance of 9d (FIG. 1) and the computer generated three-dimensional object rotates in the same direction as the lateral travel of the mask about, for instance, the Y axis. This produces images which resolve into three-dimensions when viewed through an actual mask, computer-generated mask, or a lenticular screen identical to the simulated one through which the image was produced.

The three-dimensional data set is rotated from one aspect view to additional aspect views about the data set. Vertical lines (ω) pixels from fixed aspects or points of view change a series of two-dimensional aspects into the rotated three-dimensional data set which is rotated about the Y axis. The horizontal separation of each pair of adjacent unsampled pixels 9d is a d sampled pixels with a sampling starting point of zero for the sampling of the first two-dimensional aspect of the three-dimensional data set. The lateral movement of the sampling starting point is equal to (N−1)ω. This is a starting point for sampling from the first aspect which is zero. The second aspect is ω and the third aspect is 2ω, the sum of the total pixel samples being equal to 9d pixels. The resulting composite image of the data set when printed and viewed through an actual mask or grating with the same properties as the sampling mask of this invention will resolve the printed two-dimensional image into a three-dimensional image.

The primary object of the present invention is to provide an apparatus and method in which a computer-generated three-dimensional animation of a three-dimensional object is caused to be processed with the use of a simulated, computer-generated mask in the form of an algorithm for providing a two-dimensional display of the object so that, when viewed through an actual mask identical to the simulated mask, a three-dimensional image can be viewed from the various aspects about the image of the object to thereby provide three-dimensional data from two-dimensional data.

Other objects of the present invention will become apparent as the following specification progresses, reference being had to the drawings herein for an illustration of the invention.

BRIEF DESCRIPTION OF THE DRAWINGS

FIG. 8 is a view similar to FIG. 3, but showing the initial aspect view and a second aspect view spaced 90° from the first aspect view;

FIG. 9 is a schematic view of an imaginary mask formed in carrying out the teachings of the present invention and illustrating the various values for the parameters of the mask;

FIG. 10 is a schematic view of an initial three-dimensional object and the matrix formed from the object in carrying out the teachings of the present invention;

FIG. 11 is a schematic view of a sample grating matrix formed with the teachings of the present invention;

DESCRIPTION OF THE PREFERRED EMBODIMENT

Figure 3:
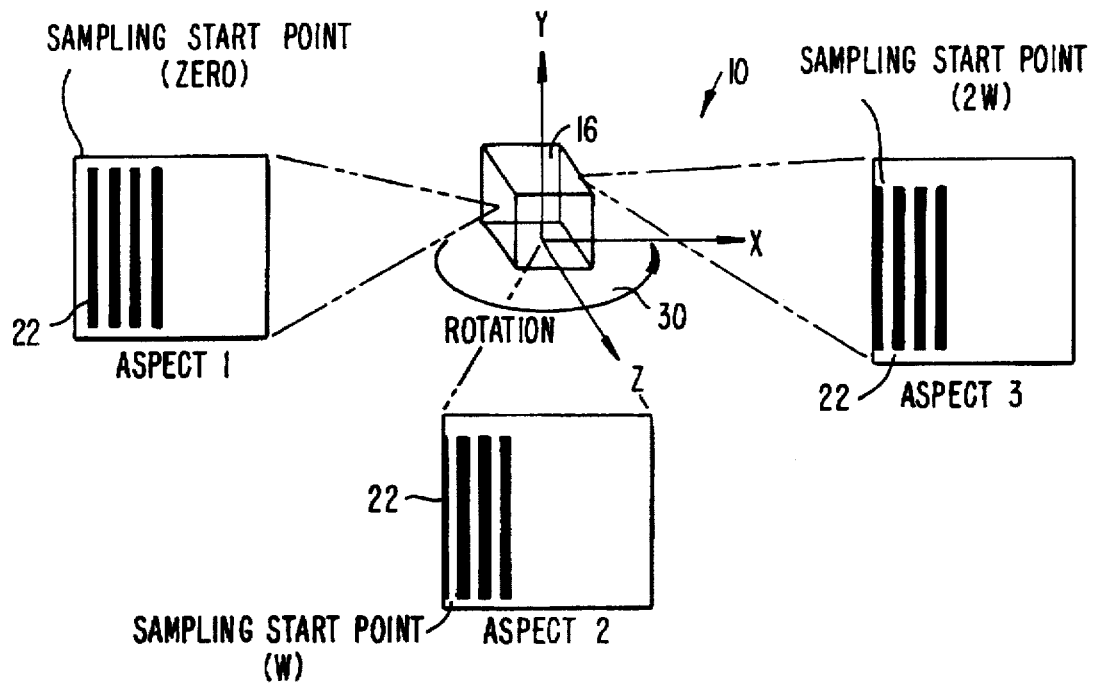
FIG. 3 is a view similar to FIG. 2 but showing the data set rotating as the mask assumes various aspect positions around the data set.
Figure 15:
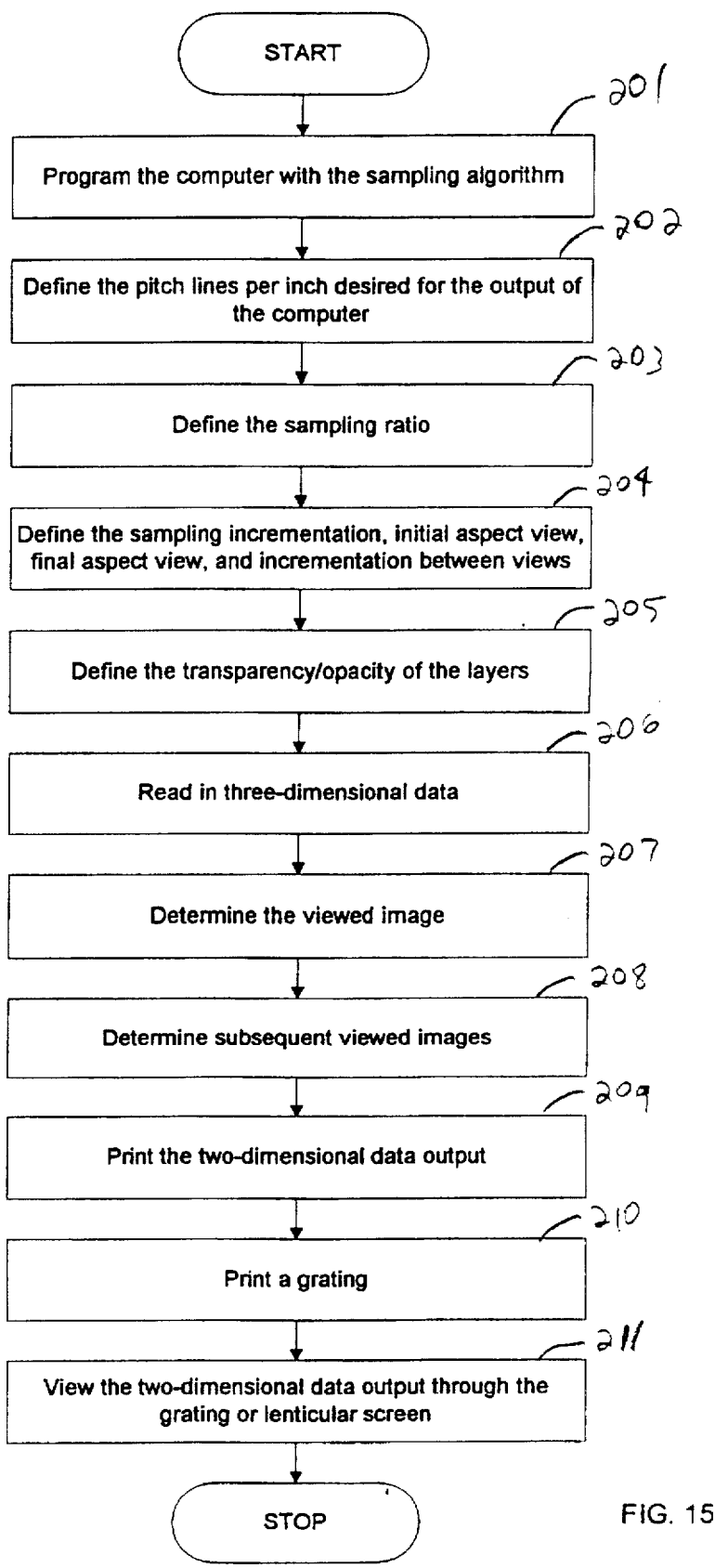
FIG. 15 is a flowchart of processing a three-dimensional data set into a composite two-dimensional image viewable as a three-dimensional image.

The process or algorithm of the present invention is set forth in the flowchart of FIG. 15 as follows:

Step 201. Program the computer with the sampling algorithm;

Step 202. Define the pitch lines per inch desired for the output of the computer;

Step 203. Define sampling ratio, i.e., 1:9 as normally used in the scan camera of U.S. Pat. No. 4,823,156;

Step 204. Define the sampling incrementation ω (FIG. 1), define the initial aspect view (FIG. 3), the final aspect view and incrementation between views;

Step 205. Define the transparency/opacity of layers;

Step 206. Read in three-dimensional data from data source (e.g., MRI, CAT, CAD, database or the like);

Step 207. Determine the viewed image from the initial aspect view using the sampling algorithm and write the data to the two-dimensional data output set;

Step 208. Determine subsequent viewed images from subsequent aspects using the sampling algorithm and write the data to the two-dimensional data output set;

Step 209. Upon completion of the sampling from the full range of specified aspect views, print the two-dimensional data output set;

Step 210. Using the specifications from the steps of paragraphs 1 through 5 above, print a grating for the two-dimensional data output set; and Step 211. View the two-dimensional data set output (printed image) through the printed grating or through a lenticular screen with properties the same as the grating as U.S. Pat. No. 4,823,156.

The algorithm described above relates to a three-dimensional matrix which is a data set with three dimensions. For the purpose of the present invention, Cartesian coordinates X, Y and Z will be used.

A sample data may, for instance, be seen as DS(X,Y,Z).

A voxel is a piece of data in a three-dimensional data set. DS(0,0,0) might be the identity of a voxel in data set DS at location (0,0,0). A voxel can be assigned a value corresponding to a property of the data. For video data, some properties which may be assigned to a voxel include color, transparency, opacity, and the like. If, by convention, the value of 1 represents the color black and is assigned by DS(0,0,0)=1, then the voxel at DS(0,0,0) would be a three-dimensional black dot (a white voxel will be zero in the convention 0=white, 1=black).

A two-dimensional matrix is a data set with two dimensions. With the algorithm used above, Cartesian coordinates are used as X and Y. A sample data might be seen as DS(X,Y).

A pixel is a single piece of data on a two-dimensional data set just as a voxel is a piece of data from a three-dimensional data set. Just as a voxel can be assigned a value corresponding to a property, so can a pixel. Therefore, a picture can be represented mathematically by a two-dimensional matrix and an object can be represented mathematically by a three-dimensional matrix.

Figure 5:
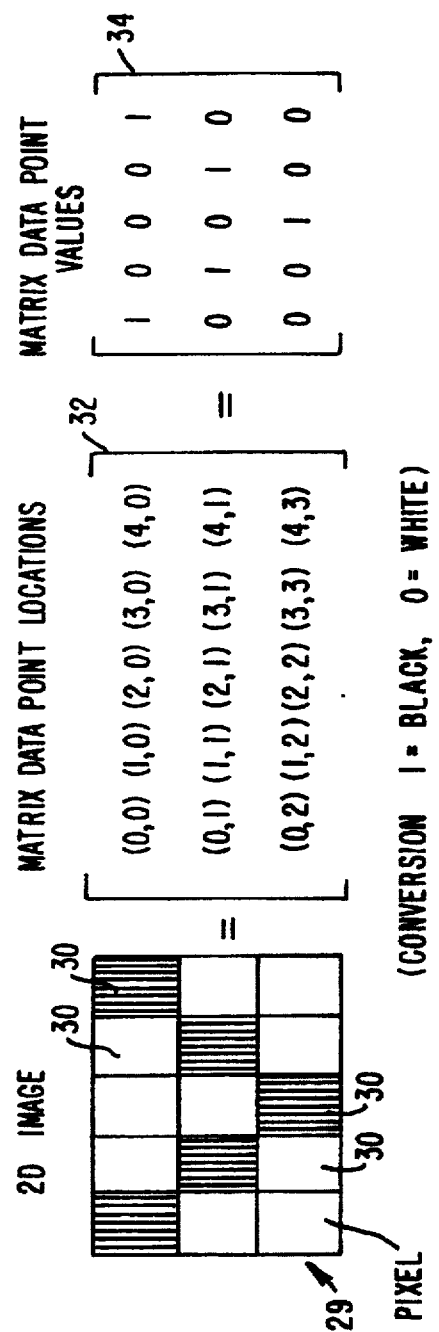
FIG. 5 is a series of three matrices, namely a two-dimensional image matrix, a data point location matrix, and a data point value matrix of the present invention.

In FIG. 5, a matrix 29 of pixels 30 form a two-dimensional image generated by the computer. A matrix 32 of data point locations is shown in FIG. 5 between matrix 30 and a matrix 34. Matrix 34 is made up of 1's and 0's, the convention to be assigned to matrix 34 is black=1 and white=0. Thus, matrix 34 of data point values correlates with matrix 30 at the locations set forth in matrix 32.

Figure 6:
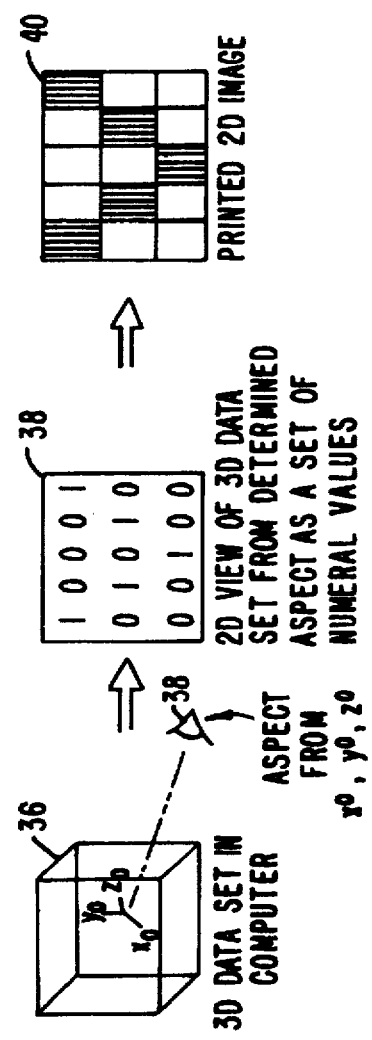
FIG. 6 is a schematic view of the three-dimensional data set to be viewed by the teachings of the present invention together with a two-dimensional view of the three-dimensional data set and the printed two-dimensional image matrix.

The digital sampling process of the present invention is illustrated in FIG. 6, wherein the three-dimensional data set 36 is viewed by the eye 38 and set in the computer in the normal fashion. The aspect is viewed from location XO, YO and ZO and the result is a two-dimensional view of the three-dimensional data set 36, the three-dimensional view being denoted by the numeral 38 and being a two-dimensional data set from a determined aspect as a set of numerical values. From the two-dimensional view of matrix 38, a printed two-dimensional image is provided and identified as matrix 40 in FIG. 6.

Figure 7:
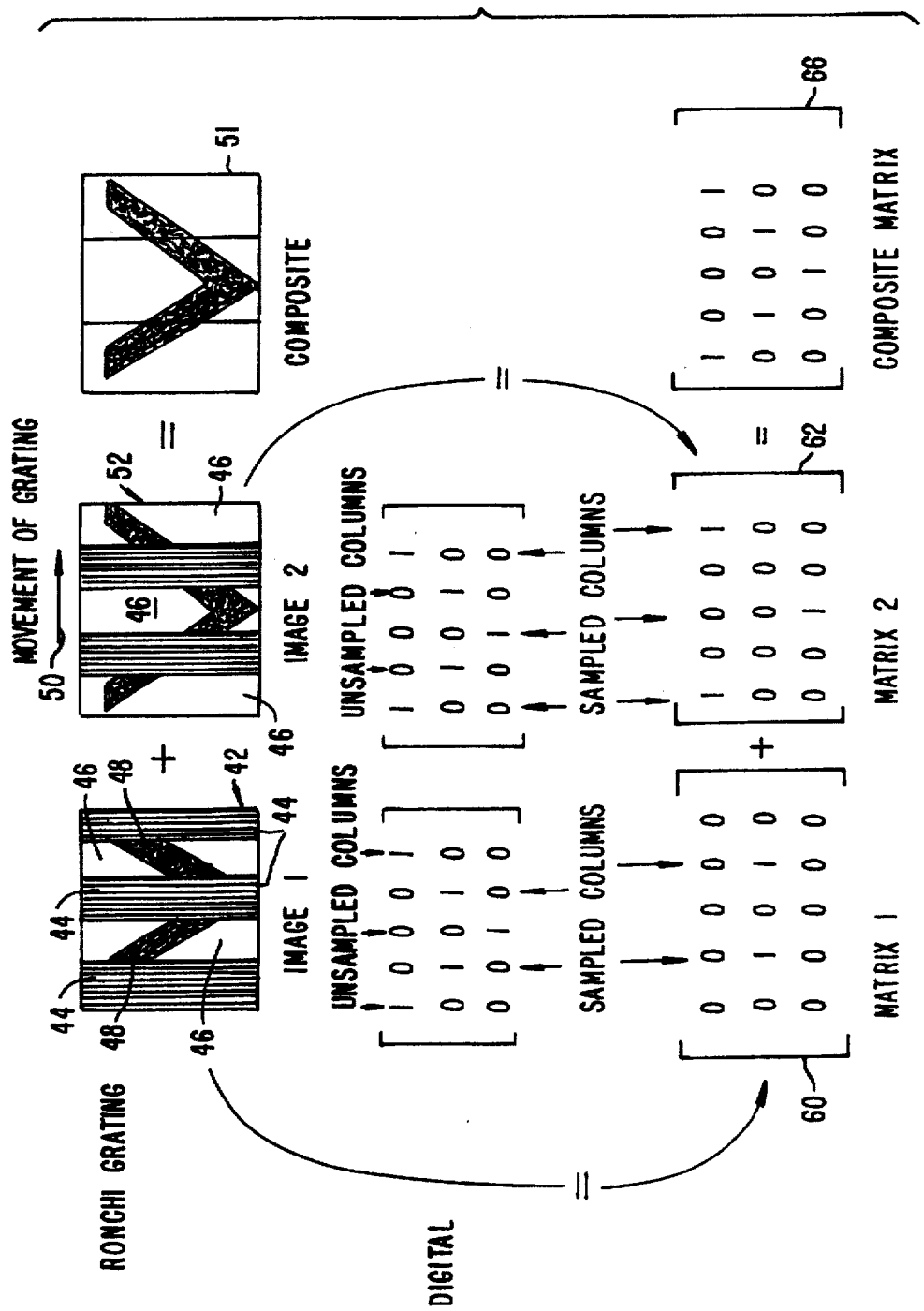
FIG. 7 is a schematic view of a Ronchi grating of the type disposed in U.S. Pat. No. 4,823,156 and showing the digital representation of the movement of the Ronchi grating relative to an object to form a first image, a second image, and a composite image of the first and second images.

FIG. 7 shows the relationship between a Ronchi grating 42 having opaque strips 44 on either side of transparent slits 46. Image segments 48 are shown as the dark spots in adjacent slits 46. The grating moves in the direction of arrow 50 and as it does, it moves the slits with it. The composite image 51 of the Ronchi grating is denoted by the numeral 54 and is shown as the sum of the images of image 1 and image 2 in FIG. 7.

In FIG. 7, the two-dimensional matrix 60 is combined and added to matrix 62 to result in a matrix 64 which is a composite matrix. A review of the grating image segments 48 in FIG. 7, known as image 1 and image 2, and the composite image, it is seen that the 1's and 0's in matrices 60, 62 and 64 have 1's and 0's corresponding to respective black and white points on the grating.

FIG. 8 shows a three-dimensional data set 70 which is viewable from one aspect by the eye 72 and by viewing another aspect by the eye 74. The aspects 72 and 74 are separated by an arc 76 of 90 degrees total travel between aspects 72 and 74. Thus, ω=10×9=90 increments and 90° divided by 90 increments gives 1 degree per increment.

FIG. 9 shows a view of one pitch line of a grating 80 having an opaque part 82 of a width 9d and a transparent slit 94 of a width d. ω is equal to the incremental sample which is measured along one end of width d. Where one pixel is less than or equal to ω which is less than or equal to d.

FIG. 10 shows a simulated grating 90 having a three-dimensional data set 92 and capable of generating the matrix 94 which is two-dimensional and leads to a storage matrix 96 and then to a completed matrix or composite matrix 98. The sample grating matrix is denoted by the numeral 100 and is shown in FIG. 11.

Figure 12:
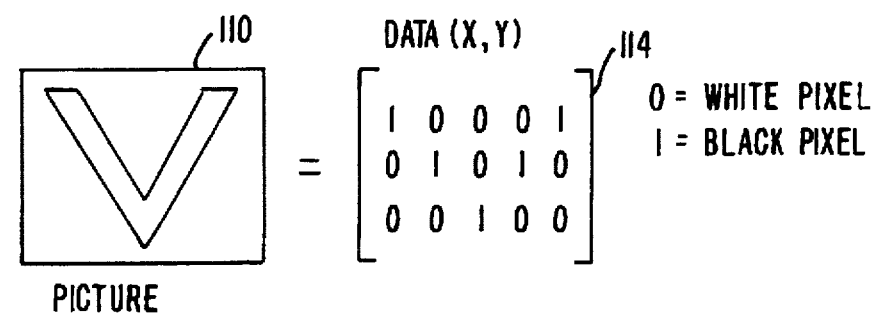
FIGS. 12, 13 and 14 are views of the matrix of the present invention correlated with the object which is three-dimensional and which is used to form a two-dimensional image and the output matrix of the present invention.
Figure 13:
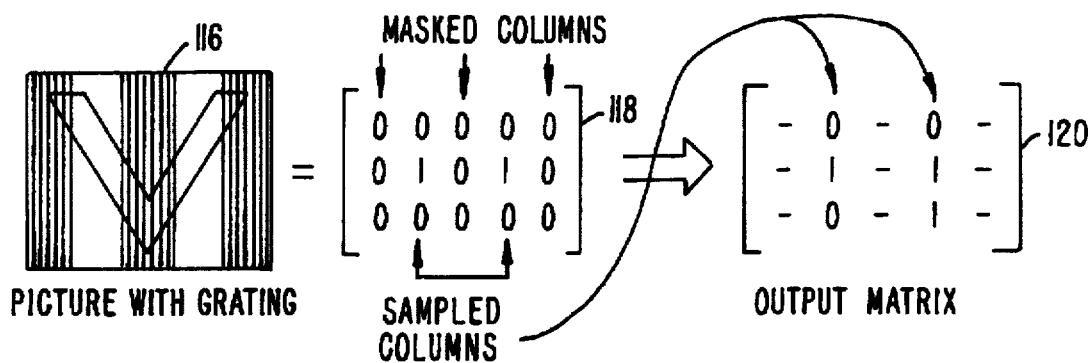
Figure 14:
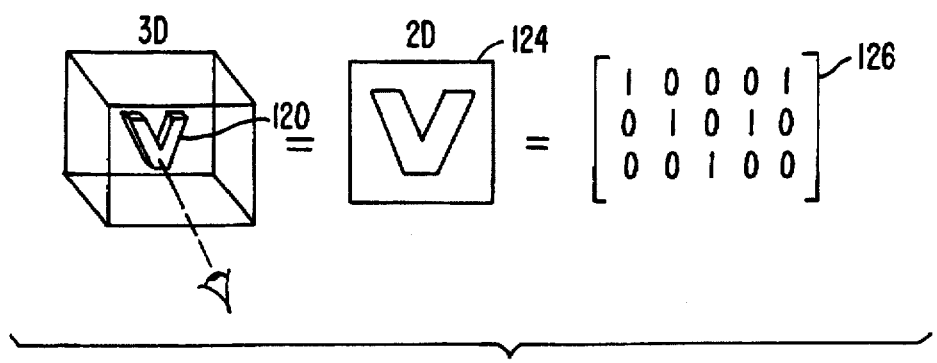

The image of the present invention denoted by numeral 110 and is shown in FIG. 12. It is associated with a two-dimensional data matrix 114 in which zero is the white pixels and one equals the black pixels. The image with the grating is denoted by the numeral 116 and is shown in FIG. 13 as associated with a digital representation matrix 118 of wanted zeros and is associated with an output matrix 120. In a process of the present invention, the three-dimensional image of the object denoted by the numeral 120 in FIG. 14 is readable as a two-dimensional matrix 124 which results in the image matrix 126.

Figure 4:
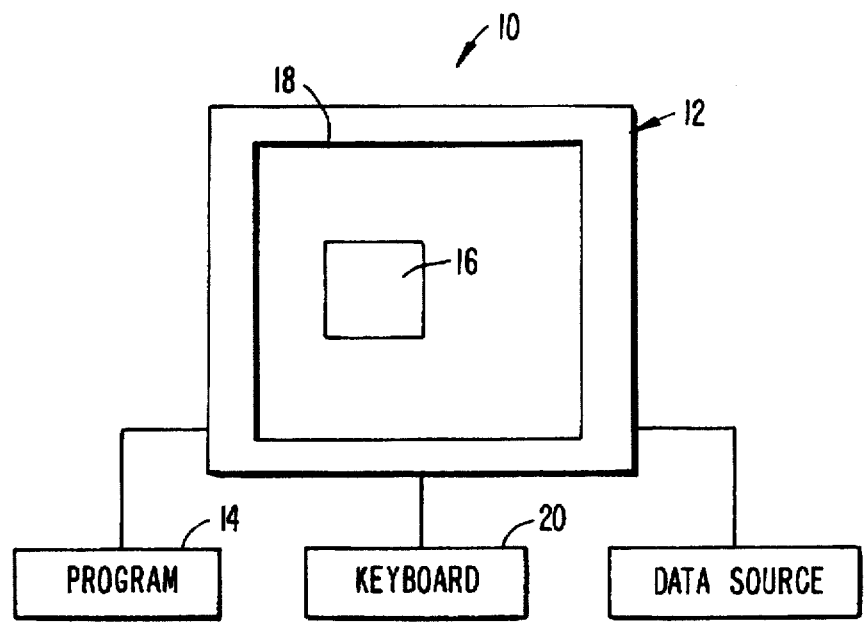
FIG. 4 is a block diagram of a computer, showing the data source, the software input and keyboard control therefor.
Figure 4A:
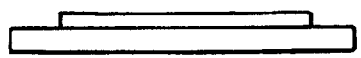
FIG. 4A is a film and actual mask combination for viewing the film to obtain three-dimensional images from a two-dimensional film.

The apparatus of the present invention is broadly denoted by the numeral 10 and comprises a computer 12 (FIG. 2) which is operated under the control of a computer program 14 (FIG. 4) to produce the image 16 on a display 18 of the computer. The program is executed by operation of a keyboard 19. A simulated mask 20 is associated with the display 18 of a computer 12 and the display generates the mask as part of carrying out the program 14 and as part of the image on the display 18 of computer 12.

Figure 1:
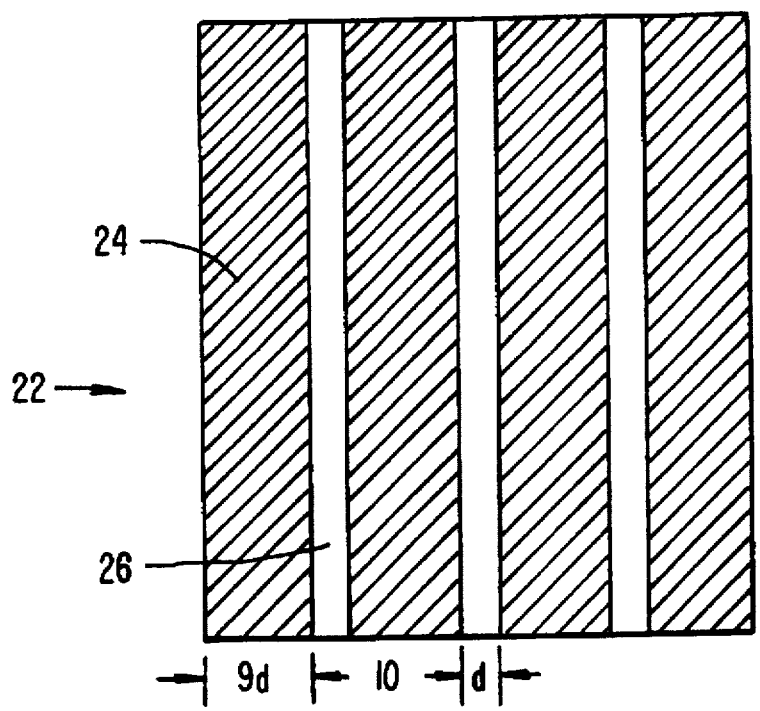
FIG. 1 is a schematic view of a mask generated by a computer for use in displaying two-dimensional images of a three-dimensional object.

FIG. 1 shows the makeup of the simulated computer generated mask. It is an image which has regions 24 which simulate strips of opaque material. The mask also simulates a grating having precisely scribed, transparent slits 26 between adjacent opaque strips 24. The ratio in the width of the opaque strips 24 to the width of the transparent slits 26 can be any suitable number but for purposes of illustration, is selected to be 9:1 as shown in FIG. 1. Typically, the width of each transparent slit 26 is d and the width of each opaque strip 24 is 9d.

Figure 2:
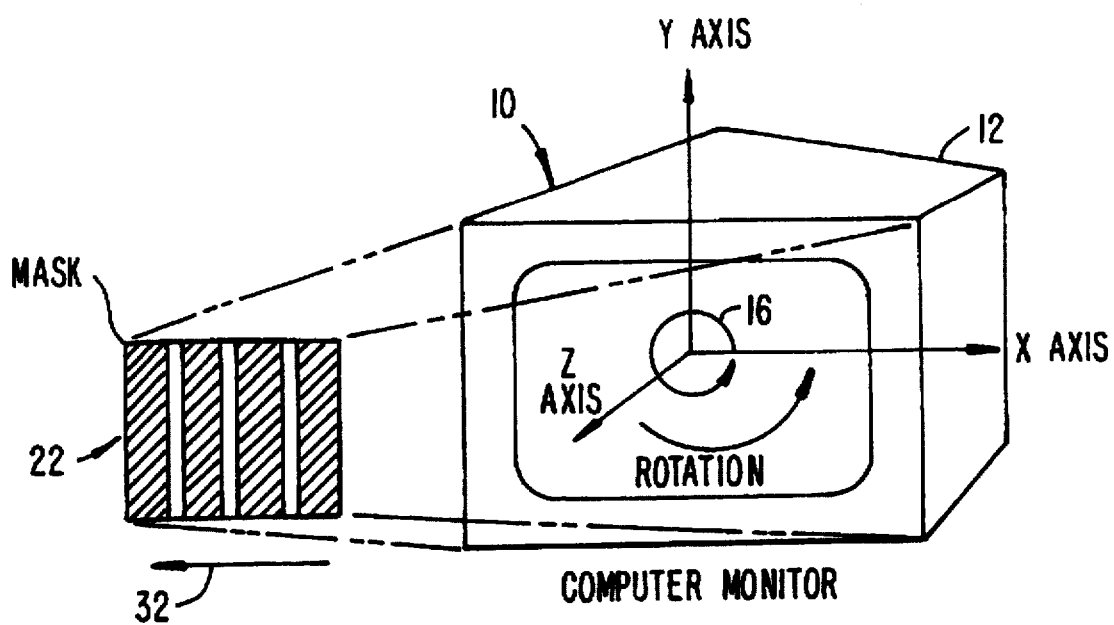
FIG. 2 is a schematic view of a computer showing the way in which the mask and data set on the computer move relative to each other during a scan of a three-dimensional image.

The basic operation of the apparatus is shown in FIG. 2 and includes the generation of a data set from input data from a source 27 having a control means 28 (FIG. 4) coupled to the computer. The control means can be any suitable data source, such as in magnetic resonance imaging apparatus, an X-ray beam source, a laser beam source and other electromagnetic radiation source. The image of the data set is placed at image position 16 of FIG. 2 and the program 14e operates the computer such that the data set 16 is caused to rotate in the direction of arrow 30 (FIG. 2) during the operation of the system.

What is claimed is:

1. In a computer system, a method for processing a three-dimensional data set into a composite two-dimensional image viewable as a three-dimensional image, comprising the steps of:

receiving as input the three-dimensional data set;
  defining a sampling ratio;
  sampling the three-dimensional data set to produce an initial two-dimensional view;
  writing the initial two-dimensional view to a two-dimensional data set utilizing the sampling ratio;
  sampling the three-dimensional data set to produce at least one subsequent two-dimensional view;
  writing the at least one subsequent two-dimensional view to the two-dimensional data set utilizing the sampling ratio;
  printing a composite two-dimensional image from the two-dimensional data set; and
  printing a printed grating according to the sampling ratio, wherein the composite two-dimensional image is viewable as a three-dimensional image through the printed grating.

2. The method of claim 1, further comprising the step of defining an incrementation between the initial two-dimensional view and the at least one subsequent two-dimensional view.

3. The method of claim 1, further comprising the step of defining an initial aspect view for the initial two-dimensional view.

4. The method of claim 1, further comprising the step of defining a final aspect view for the at least one subsequent two-dimensional view.

5. The method of claim 1, wherein the three-dimensional data set is from a source, the source selected from the group consisting of MRI, CAT, CAD, or database.

6. The method of claim 1, wherein the sampling steps are performed by a sampling algorithm.

7. The method of claim 6, further comprising the step of programming the computer system with the sampling algorithm.

8. The method of claim 1, wherein the composite two-dimensional image is viewable as a three-dimensional image through a lenticular screen.

9. The method of claim 1, wherein the sampling ratio is 1:9.

10. The method of claim 1, further comprising the step of defining the pitch lines per inch for the composite two-dimensional image.

11. A computer system for processing a three-dimensional data set into a composite two-dimensional image viewable as a three-dimensional image, comprising:

means for receiving as input the three-dimensional data set;
  means for defining a sampling ratio;
  means for sampling the three-dimensional data set to produce an initial two-dimensional view;
  means for writing the initial two-dimensional view to a two-dimensional data set utilizing the sampling ratio;
  means for sampling the three-dimensional data set to produce at least one subsequent two-dimensional view;
  means for writing the at least one subsequent two-dimensional view to the two-dimensional data set utilizing the sampling ratio;
  means for printing a composite two-dimensional image from the two-dimensional data set; and
  means for printing a printed grating according to the sampling ratio, wherein the composite two-dimensional image is viewable as a three-dimensional image through the printed grating.

12. A computer program product for processing a three-dimensional data set into a composite two-dimensional image viewable as a three-dimensional image, comprising:

computer code that receives as input the three-dimensional data set;
  computer code that defines a sampling ratio;
  computer code that samples the three-dimensional data set to produce an initial two-dimensional view;
  computer code that writes the initial two-dimensional view to a two-dimensional data set utilizing the sampling ratio;
  computer code that samples the three-dimensional data set to produce at least one subsequent two-dimensional view;
  computer code that writes the at least one subsequent two-dimensional view to the two-dimensional data set utilizing the sampling ratio;

computer code that prints a composite two-dimensional image from the two-dimensional data set;

computer code that prints a printed grating according to the sampling ratio, wherein the composite two-dimensional image is viewable as a three-dimensional image through the printed grating; and a computer readable storage medium that stores the computer codes.

13. In a computer system, a method for processing a three-dimensional data set into a composite two-dimensional image viewable as a three-dimensional image, comprising the steps of:

receiving as input the three-dimensional data set;

defining a sampling ratio;

defining a transparency or opacity of layers in the three-dimensional data set;

sampling the three-dimensional data set to produce an initial two-dimensional view utilizing the transparency or opacity of the layers;

writing the initial two-dimensional view to a two-dimensional data set utilizing the sampling ratio;

sampling the three-dimensional data set to produce at least one subsequent two-dimensional view utilizing the transparency or opacity of the layers;

writing the at least one subsequent two-dimensional view to the two-dimensional data set utilizing the sampling ratio;

printing a composite two-dimensional image from the two-dimensional data set, wherein the composite two-dimensional image is viewable as a three-dimensional image through a printed grating or lenticular screen.

* * * * *